United States Patent
Sarsfield et al.

[19]

[11] Patent Number: 6,062,100

[45] Date of Patent: May 16, 2000

[54] CONNECTION FOR ENERGY ABSORBING STEERING COLUMN

[75] Inventors: Robert Allen Sarsfield, Freeland; James Salois, Midland; Richard Kremer Riefe, Saginaw, all of Mich.

[73] Assignee: General Motors Corporation, Detroit, Mich.

[21] Appl. No.: 09/215,053

[22] Filed: Dec. 17, 1998

[51] Int. Cl.[7] ...................................................... B62D 1/19
[52] U.S. Cl. ........................... 74/492; 188/376; 248/548; 248/900; 280/777
[58] Field of Search .............................. 74/492; 188/371, 188/376; 248/548, 900; 280/777

[56] References Cited

U.S. PATENT DOCUMENTS

| | | | |
|---|---|---|---|
| 3,476,345 | 11/1969 | Ristau | 248/221 |
| 3,813,960 | 6/1974 | Windett et al. | 74/492 |
| 4,884,778 | 12/1989 | Yamamoto | 248/548 |
| 5,390,955 | 2/1995 | Kaliszewski et al. | 280/777 |
| 5,899,116 | 5/1999 | Armstrong et al. | 74/492 |
| 5,979,860 | 11/1999 | Jurik et al. | 248/548 |

*Primary Examiner*—Allan D. Herrmann
*Attorney, Agent, or Firm*—Edmund P. Anderson

[57] ABSTRACT

A connection between a collapsible mast jacket of an energy absorbing steering column and a body of a motor vehicle including a mounting bracket on the mast jacket having a planar flange parallel to a longitudinal centerline of the steering column, a V-shaped slot in the planar flange, and a V-shaped capsule in the V-shaped slot clamped rigidly to the body of the motor vehicle. A pair of channels in converging sides of the V-shaped capsule receive corresponding edges of the V-shaped slot for vertical support of the mast jacket on the vehicle body. The V-shaped capsule is retained on the mounting bracket by a pair of integral lugs on opposite sides of the V-shaped capsule seated in retaining notches in the edges of the V-shaped slot. Impact forces on the steering column fracture the integral lugs to release the mast jacket for energy absorbing collapse. One of the integral lugs is on a cantilever spring on the V-shaped capsule which snaps the lug resiliently into the corresponding one of the retaining notches when the V-shaped capsule is pushed manually into the V-shaped slot.

5 Claims, 2 Drawing Sheets

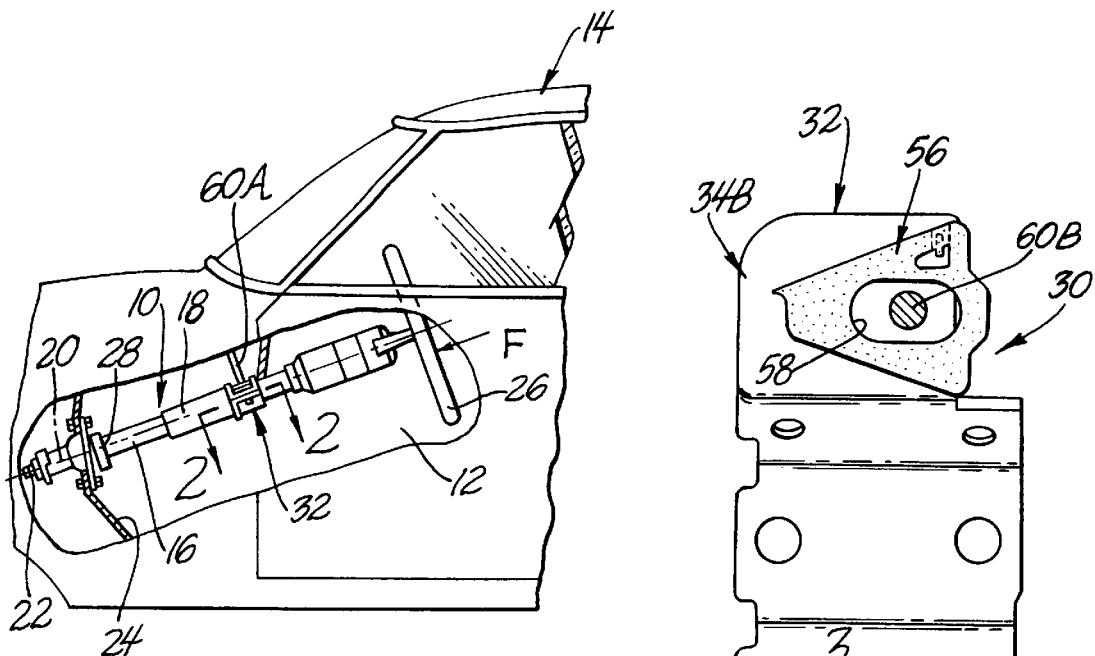
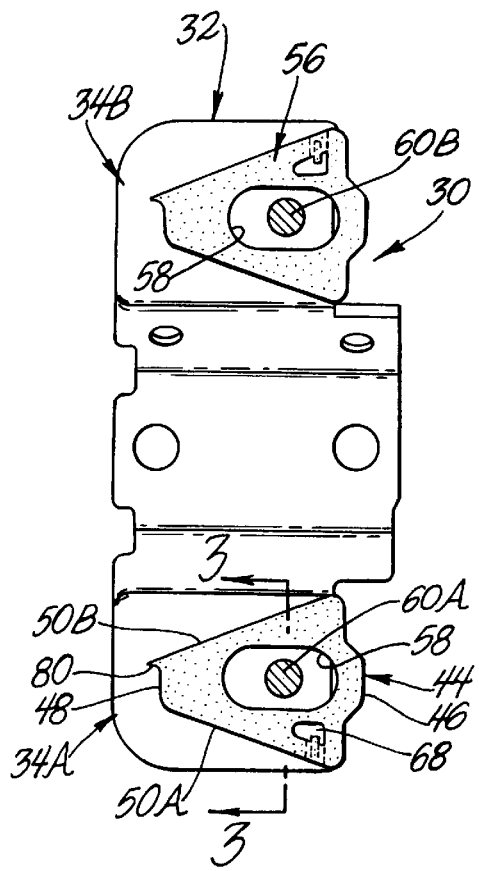
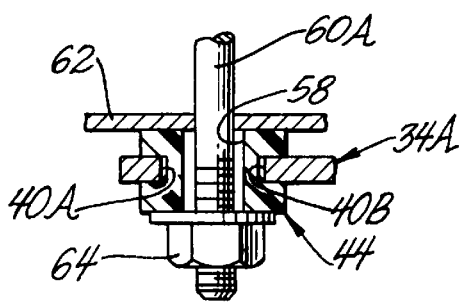
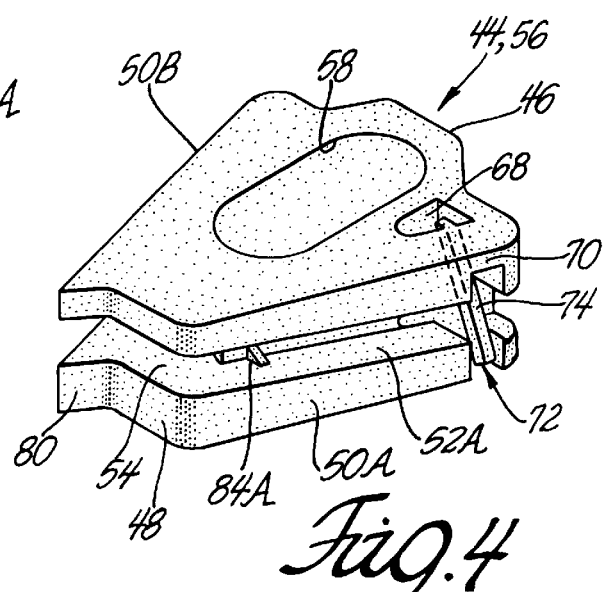

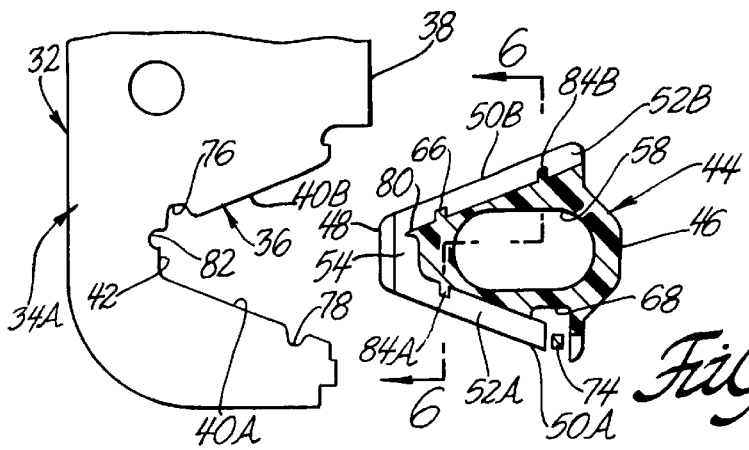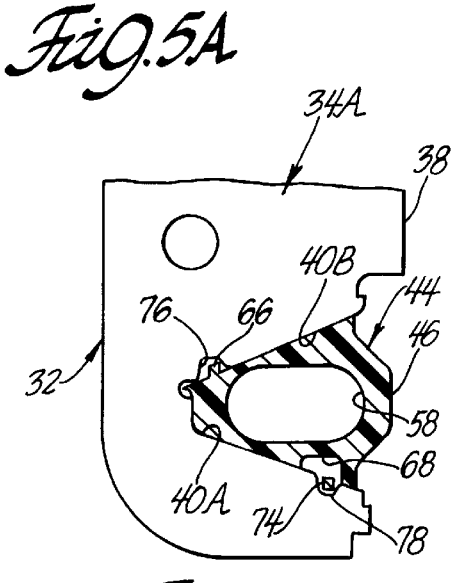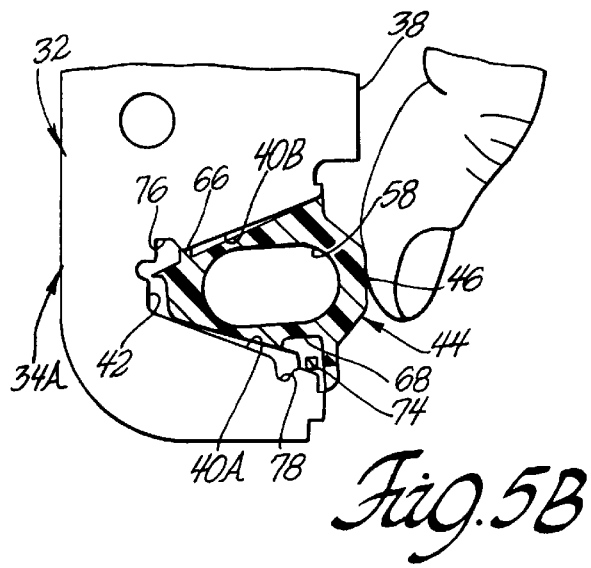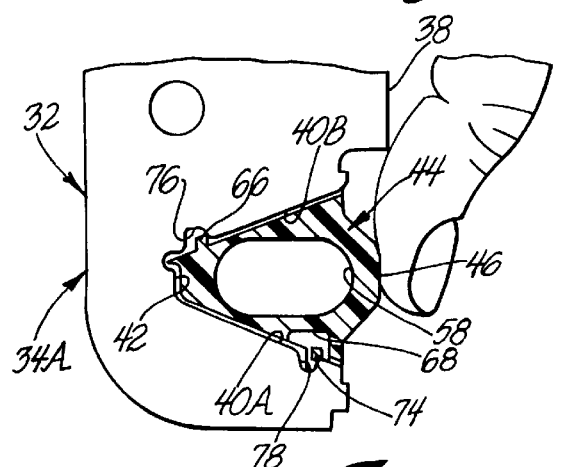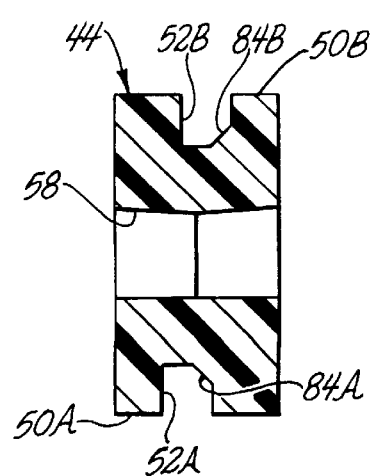

6,062,100

CONNECTION FOR ENERGY ABSORBING STEERING COLUMN

TECHNICAL FIELD

This invention relates to a connection between an energy absorbing steering column and a body of a motor vehicle.

BACKGROUND OF THE INVENTION

U.S. Pat. No. 3,392,599, issued Jul. 16, 1968 and assigned to the assignee of this invention, describes an energy absorbing steering column for a motor vehicle including a tubular mast jacket which collapses longitudinally through an energy absorbing stroke in response to an impact on the steering column. An upper or outboard connection between the mast jacket and a body of the motor vehicle includes a mounting bracket on the mast jacket having a pair of lateral flanges, a pair of open slots in the lateral flanges, a pair of capsules slidably mounted in the slots and rigidly clamped to the vehicle body, and a plurality of injection molded plastic pins which couple the capsules to the lateral flanges of the mounting bracket. The mast jacket is released for energy absorbing collapse when the plastic pins between the capsules and the mounting bracket are fractured by impact forces on the steering column. U.S. Pat. Nos. 3,795,038 and 3,868,864, issued Mar. 5, 1974 and Mar. 4, 1975 and assigned to the assignee of this invention, describe energy absorbing steering columns having similar connections in which retention between the capsules and the mounting bracket is by, respectively, tangs on the mounting bracket bent behind the capsules and tangs on the capsules bent into notches in the mounting bracket. U.S. Pat. No. 3,747,427, issued Jul. 24, 1973 and assigned to the assignee of this invention, describes an energy absorbing steering column having a similar connection in which retention between the capsules and the mounting bracket is by friction. The connection according to this invention between a mast jacket of an energy absorbing steering column and a body of a motor vehicle is a novel alternative to the connections described in the aforesaid U.S. Pat. Nos. 3,392,599, 3,795,038, 3,868,864 and 3,747,427.

SUMMARY OF THE INVENTION

This invention is a new and improved connection between a collapsible mast jacket of an energy absorbing steering column and a body of a motor vehicle including a mounting bracket on the mast jacket having a planar flange parallel to a longitudinal centerline of the steering column, a V-shaped slot in the planar flange, and a V-shaped capsule in the V-shaped slot clamped rigidly to the body of the motor vehicle. A pair of channels in converging sides of the V-shaped capsule receive corresponding edges of the V-shaped slot for vertical support of the mast jacket on the vehicle body. The V-shaped capsule is retained on the mounting bracket by a pair of integral retaining lugs on opposite sides of the V-shaped capsule seated in retaining notches in the edges of the V-shaped slot. Impact forces on the steering column fracture the integral retaining lugs to release the mast jacket for energy absorbing collapse. One of the integral retaining lugs is on a cantilever spring on the V-shaped capsule which snaps the retaining lug resiliently into the corresponding one of the retaining notches when the V-shaped capsule is pushed manually into the V-shaped slot.

BRIEF DESCRIPTION OF THE DRAWINGS

FIG. 1 is a fragmentary, partially broken-away view of a motor vehicle having an energy absorbing steering column attached to a body of the motor vehicle through a connection according to this invention;

FIG. 2 is an enlarged sectional view taken generally along the plane indicated by lines 2—2 in FIG. 1;

FIG. 3 is a sectional view taken generally along the plane indicated by lines 3—3 in FIG. 2;

FIG. 4 is a perspective view of a V-shaped capsule of the connection according to this invention;

FIGS. 5A–5D are horizontal sectional views of the connection according to this invention illustrating assembly of the V-shaped capsule on a mounting bracket; and FIG. 6 is an enlarged sectional view taken generally along the plane indicated by lines 6—6 in FIG. 5A.

DESCRIPTION OF THE PREFERRED EMBODIMENT

Referring to FIG. 1, an energy absorbing steering column 10 is disposed in a passenger compartment 12 of a motor vehicle body 14. The steering column 10 may have the construction described in the aforesaid U.S. Pat. No. 3,392,599, the disclosure of which is incorporated herein by reference. The steering column 10 includes, generally, a tubular lower mast jacket 16, a tubular upper mast jacket 18 telescopically overlapping the lower mast jacket, and an energy absorber, not shown, in the overlap between the upper and the lower mast jackets. The energy absorber provides a calibrated resistance to linear translation of the upper mast jacket relative to the lower mast jacket in the direction of a longitudinal centerline 20 of the steering column.

A steering shaft 22 is supported on the upper and the lower mast jackets for rotation about the longitudinal centerline 20 of the steering column. The steering shaft is connected to a steering gear, not shown, of the motor vehicle ahead of a vertical panel 24 of the vehicle body. A steering hand wheel 26 is rigidly attached to the top of the steering shaft 22 outboard of the upper mast jacket 18.

The lower mast jacket 16 is connected to the body 14 of the motor vehicle through a schematically represented lower bracket assembly 28 attached to the vertical panel 24. Impact forces on the steering column represented by a schematic force vector "F" on the steering hand wheel 26 are transferred from the upper mast jacket 18 to the lower mast jacket 16 through the aforesaid energy absorber and reacted to the vehicle body through the lower bracket assembly 28. The upper mast jacket 18 is attached to the vehicle body 14 by a connection 30 according to this invention.

The connection 30 includes a U-shaped mounting bracket 32 rigidly attached to the upper mast jacket 18 having a pair planar flanges 34A,34B on opposite sides of the upper mast jacket in a plane parallel to the longitudinal centerline 20 of the steering column. A V-shaped slot 36, FIG. 5A, in the flange 34A has an open side through a back edge 38 of the mounting bracket 32 and a pair of side edges 40A,40B converging toward a narrow end edge 42. A second V-shaped slot, not shown, in the other planar flange 34B is the mirror image of the V-shaped slot 36.

A first V-shaped capsule 44 of the connection 30 includes a wide end 46, a narrow end 48, and a pair of converging sides 50A,50B matching the convergence of the side edges 40A,40B of the V-shaped slot 36. The converging sides 50A,50B of the V-shaped capsule are interrupted by respective ones of a pair of side channels 52A,52B which slidably receive the side edges 40A,40B of the V-shaped slot. The narrow end 48 of the V-shaped capsule is interrupted by an end channel 54 which merges with the side channels 52A, 52B and which slidably receives the end edge 42 of the V-shaped slot. The side channels and the end channel of the V-shaped capsule cooperate with the side edges and the end edge of the V-shaped slot in capturing the V-shaped capsule 44 on the mounting bracket perpendicular to the planar flange 34A. A second V-shaped capsule 56, FIG. 2, of the connection 30 is substantially the mirror image of the first V-shaped capsule 44 and is similarly captured perpendicular to the planar flange 34B in the aforesaid second V-shaped slot.

Each of the V-shaped capsules 44,56 has an elongated aperture 58 therein. A pair of hangers 60A,60B are rigidly attached to the body 14 of the motor vehicle perpendicular to a schematically represented platform 62, FIG. 3, thereof and extend through respective ones of the apertures 58 in the V-shaped capsules. Respective ones of a pair of nuts 64 on screw threads on the lower ends of the hangers 60A,60B clamp corresponding ones of the V-shaped capsules 44,56 against the platform 62 so that the upper mast jacket 18 is supported vertically on the vehicle body through the mounting bracket 32.

As seen best in FIGS. 4–6, the V-shaped capsule 44 has a first integral lug 66 thereon in the side channel 52B near the narrow end 48 of the V-shaped capsule and a vertical channel 68 near the wide end 46 of the V-shaped capsule intersecting the side channel 52A thereof. An integral bridge 70, FIG. 4, on the V-shaped capsule spans the vertical channel 68. A cantilever spring 72 in the vertical channel 68 integral with the bridge 70 traverses the side channel 52A below the bridge and is resiliently flexible perpendicular to the side 50A of the V-shaped capsule. A segment of the cantilever spring 72 in the side channel 52A of the V-shaped capsule defines a second integral lug 74 on the V-shaped capsule.

The first integral lug 66 is seated in a first retaining notch 76 in the side edge 40B of the V-shaped slot 36 near the end edge 42 thereof. The second integral lug 74 is seated in a second retaining notch 78 in the side edge 40A of the V-shaped slot near the open side thereof. The first and the second integral lugs 66,74 cooperate with the first and the second retaining notches 76,78 in preventing dislodgment of the V-shaped capsule 44 from the V-shaped slot 36 through the open side thereof. The second V-shaped capsule 56 is similarly retained in the aforesaid second V-shaped slot in the planar flange 34B of the mounting bracket 32.

Impact forces on the steering hand wheel 26 represented by the schematic force vector "F" are initially reacted to the vehicle body through the planar flanges 34A,34B on the mounting bracket 32, the first and second integral retaining lugs 66,74 on the V-shaped capsules 44,56, and the hangers 60A,60B. When such impact forces exceed the structural integrity of the material from which the V-shaped capsules are fabricated, e.g. structural plastic, the integral retaining lugs 66,74 fracture and release the planar flanges 34A,34B from the V-shaped capsules. With the mounting bracket thus released, the upper mast jacket 18 is released from the vehicle body for linear translation relative to the lower mast jacket 16 in the direction of the longitudinal centerline 20 of the steering column through a collapse stroke against the calibrated resistance of the aforesaid energy absorber. Importantly, the side and end channels 52A,52B,54 on the V-shaped capsules separate from the side and end edges 40A,40B,42 of the V-shaped slots almost concurrently with the onset of relative linear translation of the upper mast jacket in the direction of the longitudinal centerline 20 to minimize potential interference between the capsules and the mounting bracket 32.

As seen best in FIGS. 5A–5D, the V-shaped capsules 44,56 snap into the V-shaped slots in the planar flange of the mounting bracket through the open sides of the latter for retention without resort to secondary manufacturing operations such as in situ injection molding plastic pins as described in the aforesaid U.S. Pat. No. 3,392,599. For example, the V-shaped capsule 44 is aligned horizontally with the planar flange 34A facing the open side of the V-shaped slot 36 and advanced linearly into the latter, FIG. 5A. As the narrow end 48 of the V-shaped capsule approaches the narrow end edge 42 of the V-shaped slot, the first integral retaining lug 66 bears against the side edge 40B and thrusts the bottom of the side channel 52A against the side edge 40A of the V-shaped slot, FIG. 5B. At the same time, the second retaining lug 74 bears against the side edge 40A of the V-shaped slot behind the retaining notch 78 therein. The side edges 40A,40B of the V-shaped slot are thus partially received in the side channels 52A,52B in the V-shaped capsule with the latter turned horizontally relative to the direction of the longitudinal centerline 20 of the steering column, FIG. 5B.

From that position of the V-shaped capsule, additional finger pressure applied to the wide end 46 of the V-shaped capsule thrusts the latter further into the V-shaped slot, FIG. 5C. The first integral retaining lug 66 slides past the back side of the first retaining notch 76 and is thrust laterally into the notch by the side edge 40A of the V-shaped slot. A guide 80 on the narrow end 48 of the V-shaped capsule cooperates with a guide notch 82 in the end edge 42 of the V-shaped slot in assuring that the first integral retaining lug 66 seats in the first retaining notch 76. At the same time, the side edge 40A of the V-shaped slot induces flexure of the cantilever spring 72 to avoid interference between the second retaining lug 74 and the side edge 40A behind the second retaining notch 78, FIG. 5C.

Additional finger pressure applied to the wide end of the V-shaped capsule 44 thrusts the latter fully into the V-shaped slot 36, FIG. 5D, wherein the end edge 42 and the side edges 40A,40B of the V-shaped slot are fully lodged in the end channel 54 and the side channels 52A,52B on the V-shaped capsule with the first integral retaining lug 66 in the first retaining notch 76. Concurrently, the cantilever spring 72 resiliently thrusts or snaps the second integral retaining lug 74 into the second retaining notch 78. The manual thrust on the V-shaped capsule 44 to snap the latter into the V-shaped slot 36 also crushes a pair of triangular crush ribs 84A,84B, FIGS. 4, 5A and 6, on the V-shaped capsule in the side channels thereof against the side edges 40A,40B of the V-shaped slot. The crush ribs cooperate with the resilient thrust of the cantilever spring in substantially eliminating vertical and lateral lash between the V-shaped capsule and the planar flange 34A of the mounting bracket 32.

Having thus described the invention, what is claimed is:

1. A connection between a motor vehicle body and a mast jacket of a steering column collapsible in the direction of a longitudinal centerline of said steering column in response to an impact thereon comprising:

a mounting bracket rigidly attached to said mast jacket having a planar flange parallel to said longitudinal centerline of said steering column, a V-shaped slot in said planar flange having an open side and a pair of converging side edges, a V-shaped capsule having a pair of converging sides matching the convergence of said side edges of said V-shaped slot, a clamp means operative to rigidly clamp said V-shaped capsule to said vehicle body, a pair of side channels in respective ones of said converging sides of said V-shaped capsule each slidably receiving a corresponding one of said sided edges of said V-shaped slot so that said mast jacket is supported vertically on said vehicle body, a first retaining notch in a first one of said pair of side edges of said V-shaped slot, a second retaining notch in a second one of said pair of side edges of said V-shaped slot, a first integral lug on said V-shaped capsule in a first one of said pair of side channels therein seated in said first retaining notch, a second integral lug on said V-shaped capsule, and a spring means operative to support said second integral lug on said V-shaped capsule in a second one of said pair of side channels thereof for translation perpendicular to the corresponding one of said pair of converging sides of said V-shaped capsule and resiliently biasing said second integral lug into said second retaining notch, said first and said second integral lugs cooperating with said first and said second retaining notches in preventing dislodgment of said mounting bracket from said V-shaped capsule except when fractured by forces of said impact on said steering column.

2. The connection between a motor vehicle body and a mast jacket of a steering column recited in claim 1 wherein said clamp means operative to rigidly clamp said V-shaped capsule to said vehicle body comprises:

an elongated aperture in said V-shaped capsule, a vertical hanger on said vehicle body protruding through said elongated aperture, and a screw-threaded fastener on said vertical hanger below said V-shaped capsule.

3. The connection between a motor vehicle body and a mast jacket of a steering column recited in claim 2 wherein said spring means comprises:

a vertical channel in said V-shaped capsule intersecting said second one of said pair of side channels thereof, an integral bridge on said V-shaped capsule across said vertical channel, and a cantilever spring integral with said integral bridge traversing said second one of said pair of side channels of said V-shaped capsule and resiliently flexible perpendicular to the corresponding one of said converging sides of said V-shaped capsule, said second integral lug on said V-shaped capsule being defined by a segment of said cantilever spring traversing said second one of said pair of side channels of said V-shaped capsule.

4. The connection between a motor vehicle body and a mast jacket of a steering column recited in claim 3 further comprising:

an integral crush rib on said V-shaped capsule in one of said pair of side channels thereof crushed against the corresponding one of said side edges of said V-shaped slot to eliminate lash between said V-shaped capsule and said mounting bracket.

5. The connection between a motor vehicle body and a mast jacket of a steering column recited in claim 4 wherein:

said V-shaped capsule is made of molded plastic.

* * * * *